United States Patent
Schwabe et al.

(10) Patent No.: US 12,061,507 B2
(45) Date of Patent: Aug. 13, 2024

(54) AI BASED ERROR PREDICTION FOR POWER CONVERSION REGULATORS

(71) Applicant: Infineon Technologies Austria AG, Villach (AT)

(72) Inventors: Benjamin Schwabe, Munich (DE); Sandro Cerato, Taufkirchen (DE); Salman Nazir, Munich (DE)

(73) Assignee: Infineon Technologies Austria AG, Villach (AT)

( * ) Notice: Subject to any disclaimer, the term of this patent is extended or adjusted under 35 U.S.C. 154(b) by 603 days.

(21) Appl. No.: 17/022,555

(22) Filed: Sep. 16, 2020

(65) Prior Publication Data

US 2022/0083114 A1 Mar. 17, 2022

(51) Int. Cl.
  *G06F 1/28* (2006.01)
  *G06N 3/08* (2023.01)
  *G06N 20/00* (2019.01)

(52) U.S. Cl.
  CPC .............. *G06F 1/28* (2013.01); *G06N 3/08* (2013.01); *G06N 20/00* (2019.01)

(58) Field of Classification Search
  CPC ............ G06F 1/28; G06N 3/08; G06N 20/00
  See application file for complete search history.

(56) References Cited

U.S. PATENT DOCUMENTS

| | | | |
|---|---|---|---|
| 2016/0132084 A1* | 5/2016 | Solki .................... | H02M 3/157 713/320 |
| 2020/0251986 A1* | 8/2020 | Li ....................... | G06N 3/0481 |
| 2020/0373836 A1* | 11/2020 | Nagato .................. | G06N 3/04 |

OTHER PUBLICATIONS

Van Den Oord, AaRON, et al., "WaveNet: A Generative Model for Raw Audio", Deep Mind, Sep. 8, 2016, Accessed online Apr. 6, 2020 at https://deepmind.com/blog/article/wavenet-generative-model-raw-audio.

Kurokawa, Fujio , et al., "A new neural network predictor for digital control DC-DC converter", Vehicle Power and Propulsion Conference, Oct. 9-12, 2012, 1-4.

Mohamed, Yasser Abdel-Rady Ibrahim, et al., "Adaptive Discrete-Time Grid-Voltage Sensorless Interfacing Scheme for Grid-Connected DG-Inverters Based on Neural-Network Identification and Deadbeat Current Regulation", IEEE Transactions on Power Electronics, vol. 23, No. 1, Jan. 2008, 1-14.

* cited by examiner

*Primary Examiner* — Mark A Connolly
(74) *Attorney, Agent, or Firm* — Murphy, Bilak & Homiller, PLLC (57) ABSTRACT

A power conversion regulator circuit comprises a regulator input dynamically supplied with a feedback signal representative of an output parameter of a power converter circuit, a regulator output configured to provide a control signal to the power converter circuit, for making adjustments to the output of the power converter circuit, and regulator circuitry configured to generate the control signal for outputting via the regulator output, based on the error signal. The circuit further comprises a processing circuit configured to (a) implement an artificial neural network comprising a plurality of artificial neurons, where the artificial neural network is configured to compute a machine-learning-based (ML-based) prediction of the output parameter, based on the feedback signal, and (b) generate the error signal based at least in part on the ML-based prediction of the output parameter and based on a target level for the output parameter.

16 Claims, 11 Drawing Sheets

AI BASED ERROR PREDICTION FOR POWER CONVERSION REGULATORS

TECHNICAL FIELD

This disclosure relates generally to electric power conversion circuits, and more particularly relates to power conversion circuits incorporating machine-learning-based control.

BACKGROUND

Electrical power converters, referred to herein in general terms as power conversion circuits, are in wide practical use in various technical fields. This applies in particular to switched-mode DC-DC power converters, such as for power supply of central processing units (CPUs) or graphics processing units (GPUs) of computers or similar devices. Designers of power converters go through great efforts in order to optimize the converter and power converter controllers to provide more and more advanced features to better match specific application needs, with these advanced features including such things as multi-phase implementations with automatic phase shedding, digital control, non-linear control schemes, etc.

Generally speaking, a switched-mode power conversion circuit comprises at least one switching device to be switched, in a controlled manner, to perform the power conversion. The switching operation is controlled by a regulator circuit, which is often tuned before use by adjusting at least one regulator parameter. Such adjustments can be critical for the operation performance of the power converter and they can be sensitive with regard to even minor changes in the design or in the selection of electric component values. In the well-known type of the PID regulator, the regulator parameters comprise the respective coefficients of the proportional (P) part, the integral (I) part, and the derivative (D) part thereof. The present disclosure is, however, not limited to PID regulators and also relates to other types of power converters, whether comprising simple P, I or D power converters or any combinations of these parts, or not. Likewise, the disclosure relates to single-phase power converters as well as to multi-phase power converters.

The advanced approaches to control of power conversion circuits make tuning a power converter a time-consuming job for a highly skilled engineer. Despite these efforts, the resulting performance may still be less than optimal, for reasons such as the following:

1. The complicated control schemes require a very careful design and parameter tuning for the converter, and adjustments are required even for minor changes in the design.
2. Depending on the application, the objectives for the conversion circuit's performance change—these varying objectives need to be respected in the test set for tuning.
3. Passive devices (e.g., output capacitors) age over time, leading to changing behavior and potential performance loss during the circuit's lifetime.

A first measure to ensure longtime-stability and high performance of a power converter is to choose high-quality components, especially capacitors, with small aging effects. These high-quality components, however, can dramatically impact the circuits' costs.

Increasingly flexible, non-linear control algorithms may also be used to improve the system behavior, but these control algorithms need to be tuned carefully, for specific applications, and might have unwanted side effects, especially if the operating conditions are different than what was anticipated by the designer. The applicable specifications for each application lead to application-specific test plans. Due to all of this complexity, only experts in the field of power conversion can design and tune a power converter solution that will work at (almost) peak performance for a long time.

An object of the present disclosure is to provide power conversion circuits that provide improved performance for a wider range of operating conditions, permitting simpler deployment of high-performance circuits.

SUMMARY

An example embodiment of a power conversion regulator circuit configured according to the techniques described herein comprises a regulator input dynamically supplied with a feedback signal representative of an output parameter of a power converter circuit, a regulator output configured to provide a control signal to the power converter circuit, for making adjustments to the output of the power converter circuit, and regulator circuitry configured to generate the control signal for outputting via the regulator output, based on the error signal. The circuit further comprises a processing circuit configured to (a) implement an artificial neural network comprising a plurality of artificial neurons, where the artificial neural network is configured to compute a machine-learning-based (ML-based) prediction of the output parameter, based on the feedback signal, and (b) generate the error signal based at least in part on the ML-based prediction of the output parameter and based on a target level for the output parameter.

Another example embodiment is a variant of the embodiment summarized above and is likewise a power conversion regulator circuit comprising a regulator input configured to be dynamically supplied with a feedback signal representative of an output parameter of a power converter circuit and a regulator output configured to dynamically provide a control signal to the power converter circuit, for making adjustments to the output of the power converter circuit. This example embodiment comprises a processing circuit configured to (a) implement an artificial neural network comprising a plurality of artificial neurons, wherein the artificial neural network is configured to compute a machine-learning-based (ML-based) error signal, based on at least the feedback signal and a target level for the output parameter, and (b) output a correction signal, based at least in part on the ML-based error signal. This embodiment still further comprises regulator circuitry configured to generate the control signal for outputting via the regulator output, based at least in part on the correction signal.

Still other embodiments include a regulating power converter, comprising a power converter circuit configured to perform power conversion of a power converter input to a power converter output, where at least one parameter of the power converter output is adjustable via a control signal input to the power converter circuit, and a power conversion regulator circuit operatively coupled to the power converter circuit, where the power conversion regulator circuit is either of the power conversion regulator circuits summarized above.

Still other embodiments of the techniques described herein include a method for training an artificial neural network for inclusion in a power conversion regulator circuit. This method comprises the step of connecting a regulating power converter circuit comprising an implementation of the artificial neural network to a variable test load, wherein the implementation of the artificial neural network is configured to (a) implement an artificial neural network comprising a plurality of artificial neurons, wherein the artificial neural network is configured to compute a machine-learning-based (ML-based) prediction of a value representative of an output parameter of the regulating power converter circuit, based on the feedback signal. The method further comprises generating an error signal based at least in part on the ML-based prediction of the value and based on a target level for the value, and generating a control signal for adjusting the output of the regulating power converter circuit, based on the error signal. The method still further comprises, while the regulating power converter is connected to the variable test load, executing a reinforcement-learning algorithm that defines biases and weights for the artificial neural network, the biases and weights enabling the artificial neural network to regulate the output of the power converter circuit over a range of loads and target levels for the at least one parameter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
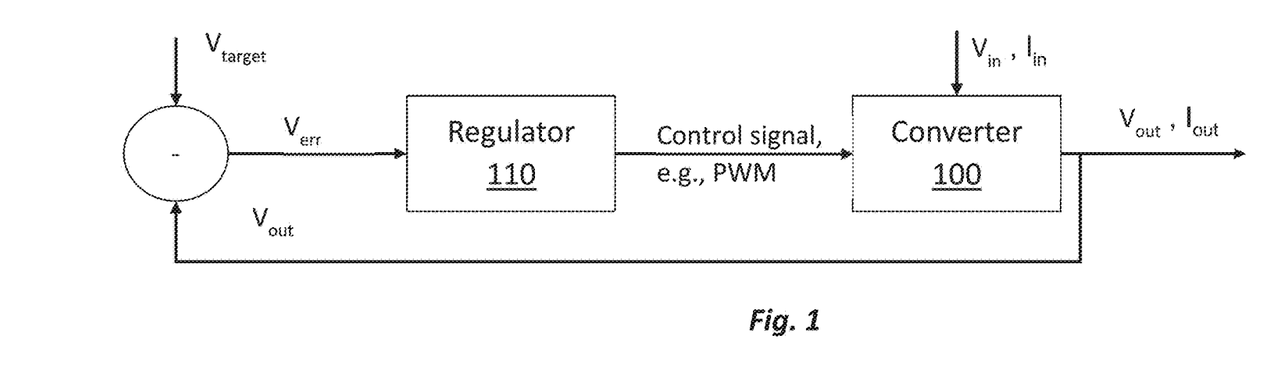
FIG. 1 is a block diagram illustrating a classical regulator circuit.

FIG. 1 is a block diagram illustrating a simplified view of a power conversion circuit. In switched-mode implementations, the converter 100, which may take any of a number of well-known forms, includes at least one switching element, which is controlled by the input control signal. The control signal may be a pulse-width modulation (PWM) signal, for example, where the duty cycle of the signal determines on/off times for one or more switching elements, thereby controlling the output parameter, Vout or Iout.

The control signal is generated by a regulator circuit, which converts an error signal, e.g., Verr, into the control signal. The error signal is produced by comparing an output parameter of the converter circuit to a target level. In the illustrated case, the output voltage Vout is compared to a target level Vtarget, to obtain a difference signal Verr. The general objective of the regulator circuit is to drive the error signal Verr to zero, but it should do so in a way that avoids instability and reduces overshoots and undershoots of the output parameter Vout. Note that while FIG. 1 illustrates control based on voltage, the principles are the same for a current-controlled. In addition, systems can combine both output voltage and output current parameters; frequency and phase of the output are also potential parameters to be regulated.

In circuits employing a conventional closed-loop control circuit like the one illustrated generally in FIG. 1, the regulator's behavior is based purely on its internal memory, i.e., as implemented in an analog and/or digital loop filter circuit and the present error signal value. Whether implemented as an analog control loop or a digital control loop, the feedback loop has limited bandwidth, e.g., due to the sampling rate for analog-to-digital conversion of Vout, in a digital loop, and thus has limited ability to dynamically track rapid changes in load conditions, for example. Further, the nature of the feedback introduces phase margin criterion for circuit stability. Various designs for both analog and digital feedback loops having the general structure shown in FIG. 1 are well known and amply described in technical literature.

A potential improvement to power conversion regulation is to incorporate machine-learning-based prediction into the circuit. One approach to this is illustrated generally in FIG. 2, where the error signal calculation circuit, which in FIG. 1 simply calculated a difference signal, is replaced with a machine-learning (ML)-based prediction circuit, or algorithm. This can be a neural network implementation, for example, where the neural network acts a filter, e.g., predicting future error development and acting to reduce the latency in correcting the output parameter in response to changes in circuit load. While this may be implemented digitally, in many cases it may be advantageous to implement all or parts of the neural network as an analog circuit, to improve speed and reduce power consumption.

Figure 2:
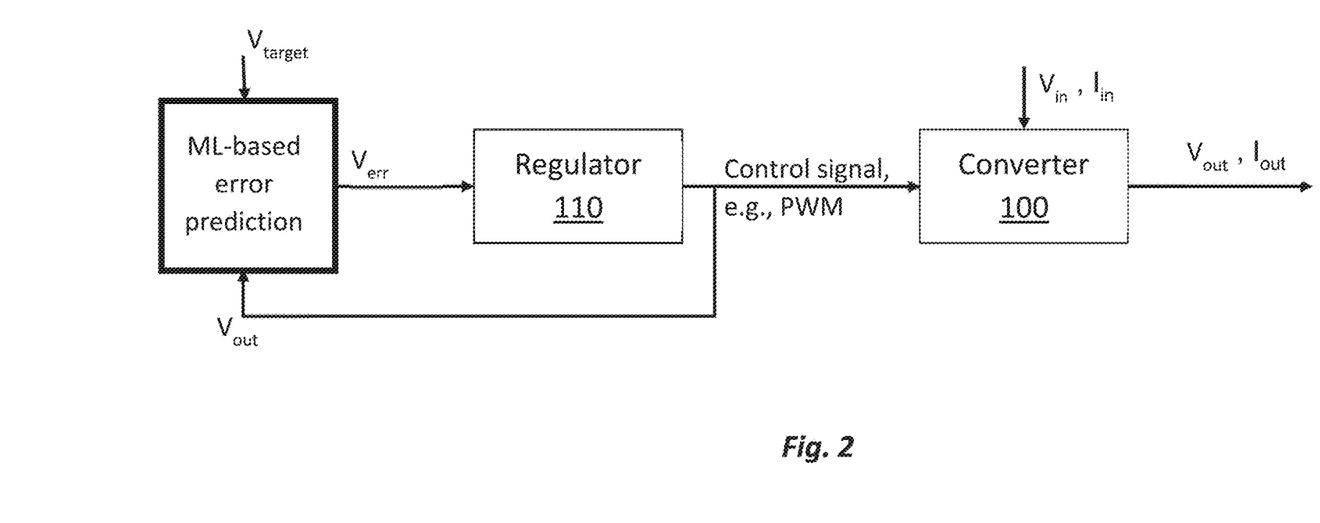
FIG. 2 illustrates a power conversion circuit using machine-learning-based error prediction.

With this approach, the neural network circuit can learn from the power conversion's past behavior, and more quickly and more accurately correct for changes in output loading conditions. For instance, the change in output signal parameter that was expected to result from a change in the error signal can be compared to the real deviation in the output signal parameter. That difference can be used to increase or decrease the circuit's response when the circuit encounters similar conditions in the future.

However, because actual operating conditions for the power conversion circuit may differ from what the ML-based prediction engine has encountered in the past, an ML-based power conversion regulator circuit may not always work as intended. In particular, its predictions may be unexpectedly far off, under unanticipated operating conditions, and the system might become poorly regulated or even unstable.

Embodiments of the techniques and circuits described herein address this problem by combining ML-based prediction with conventional error-based control. An ML-based control input is combined, in a weighted fashion, with a conventional control input, to produce a weighted control input that drives the regulation. The weights are adapted over time—when the ML-based prediction turns out to be particularly poor, the relative weighting applied to the ML-based control input is reduced for subsequent iterations of the control process. When the ML-based prediction improves, the relative weighting applied to the ML-based control input is increased.

Figure 3:
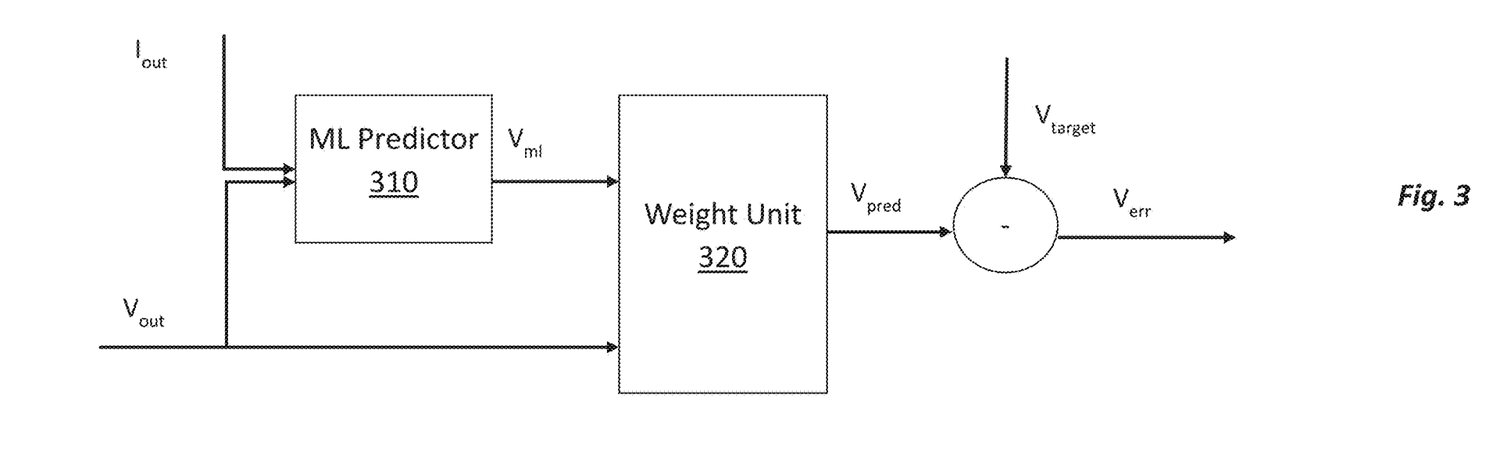
FIG. 3 and FIG. 4 illustrate two different approach to the use of machine-learning-based prediction in a regulator circuit.

FIG. 3 is a block diagram illustrating an example implementation of this approach. In this example, the parameter predicted by the ML predictor 310 is a predicted output voltage, designated $V_{ML}$. Note that any of several parameters may be monitored by the ML predictor 310, such as the power conversion circuit's output voltage $V_{out}$ and output current $I_{out}$. More particularly, for example, the predicted voltage $V_{ML}$ may be predicted based on a time-series of samples of $V_{out}$ and/or $I_{out}$, so that the ML predictor 310 can recognize and respond to trends in these parameters In the example implementation shown in FIG. 3, the predicted voltage $V_{ML}$ is combined with the actual output voltage $V_{out}$, in weight unit 320, to obtain a weighted prediction $V_{pred}$. This weighted prediction signal $V_{pred}$ is compared to the target parameter level, $V_{target}$, to generate the error signal $V_{err}$. Again, it should be understood that while the illustrated example shows voltage-based control of an output voltage, the same principles can be applied to current-based control of an output voltage or current.

Figure 4:
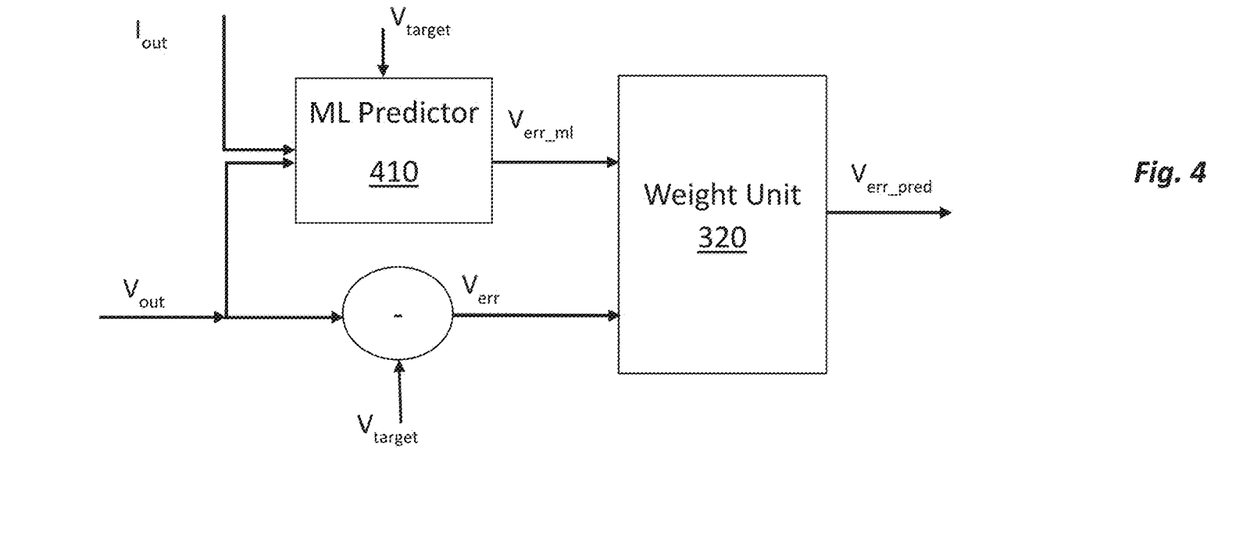

Also, it should be understood that the predicted parameter is not necessarily a direct output of the power conversion circuit. FIG. 4, for example, shows another approach in which the ML predictor 410 directly "predicts" an error signal $V_{err\_ML}$, which is then combined in a weighted fashion in weight unit 320 with a conventionally obtained voltage error signal $V_{err}$, to obtain a weighted error signal $V_{err\text{-}pred}$.

As indicated above, the parameter predicted by machine learning, e.g., $V_{ML}$, is combined with the corresponding actual parameter, e.g., $V_{out}$, in weight unit 310. For a given iteration of the control process, the weight unit 310 weights the latter high, relative to the former, if the prediction performance in the previous iteration (or multiple previous iterations) was bad. Conversely, the parameter predicted by machine learning may be weighted relative high, compared to the corresponding actual parameter, if the prediction performance in the previous iteration was good.

Thus, for example, for the example implementation illustrated in FIG. 3:

$$V_{pred} = \lambda * V_{out} + (1-\lambda) V_{ML}.$$

More generally, the weighting may be according to:

$$X_{pred} = \lambda * X_{out} + (1-\lambda) X_{ML},$$

where X corresponds to the parameter that is the subject of the prediction. Thus, $X_{pred}$ is the weighted combination, $X_{out}$ is the value representative of the current state of the output parameter, $X_{ML}$ is the ML-based prediction, and A is the weighting parameter.

The weighting parameter A weights the ML-based prediction, relative to the conventionally obtained parameter, according to the previous performance of the prediction unit. This may be done according to the following expression, for example:

$$\lambda = \max(\lambda_{min}, \min(\lambda_{max}, |X_{out}[t] - X_{pred}[t-1]|/(\mu|X_{out}[t]| + |X_{pred}[t-1]|)),$$

where $\lambda_{min}$, $\lambda_{max}$, and μ are predetermined tuning parameters, $X_{out}[t]$ is the value representative of the current state of the output parameter, and $X_{pred}[t-1]$ is a previous value of the weighted combination.

It should be understood, of course, that the above expression is simply one example of how the weighting parameter A may be calculated. The idea behind this calculation is If the prediction in the previous iteration was good, $X_{out}[t]$ and $X_{pred}[t-1]$ should be close, so it is assumed that the ML-based prediction can be trusted. If the difference between $X_{out}[t]$ and $X_{pred}[t-1]$ is large, on the other hand, the regulation should rely more heavily on the classical scheme. "Close" and "large" should be understood as relative to the values of $X_{out}[t]$ and $X_{pred}[t-1]$, which is why the difference between these is divided by their sum. The parameter μ is simply for tweaking the values a bit, if necessary. But usually, it should be roughly one. The parameters $\lambda_{min}$ and $\lambda_{max}$ simply put limits on precisely how much the ML-based prediction can be trusted. These, like the parameter might be application- and/or circuit-specific, and might in some implementations be adapted over time, e.g., to allow for an increasing level of reliance on the ML-based predictions as the circuit gains more experience.

Figure 5:
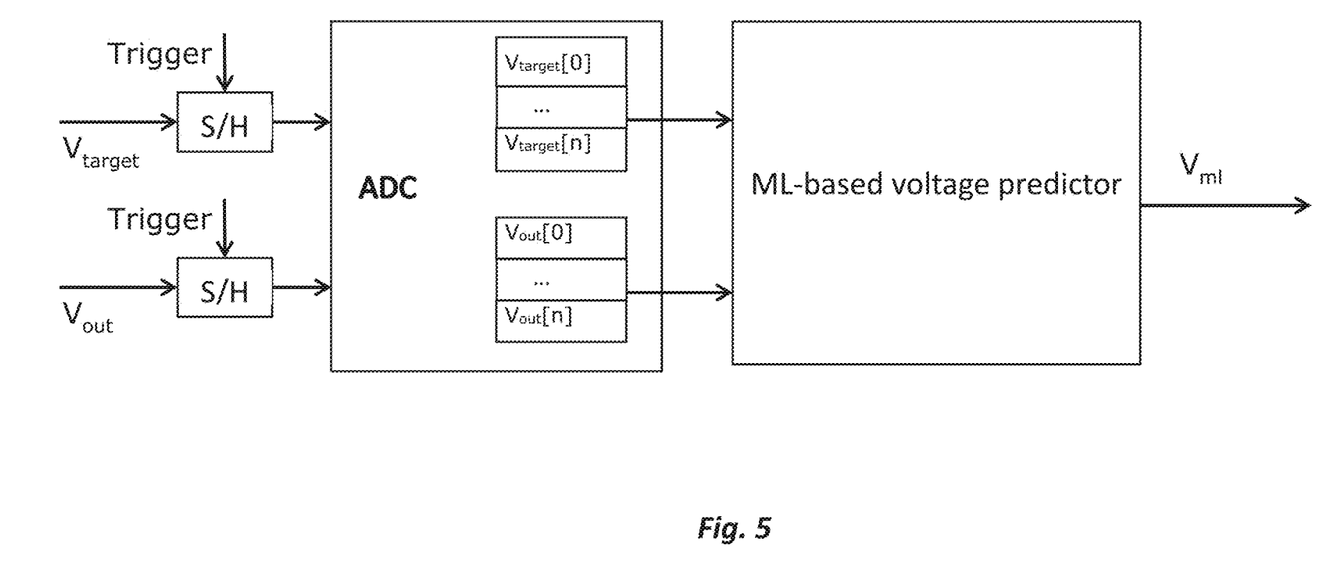
FIG. 5 illustrates details of a machine-learning-based prediction circuit using time series samples.

FIG. 5 illustrates an example implementation, using a digital approach to ML-based voltage prediction. In this implementation, the ML-predicted parameter $V_{ML}$ is generated from a digital time series of samples of the power conversion circuit output parameter $V_{out}$ as well as from a time series of samples of a parameter $V_{target}$. The parameter $V_{target}$ may be a calculated/derived parameter, e.g., calculated as a function of the load as reflected in the power conversion circuit output parameter $I_{out}$.

Figure 6:
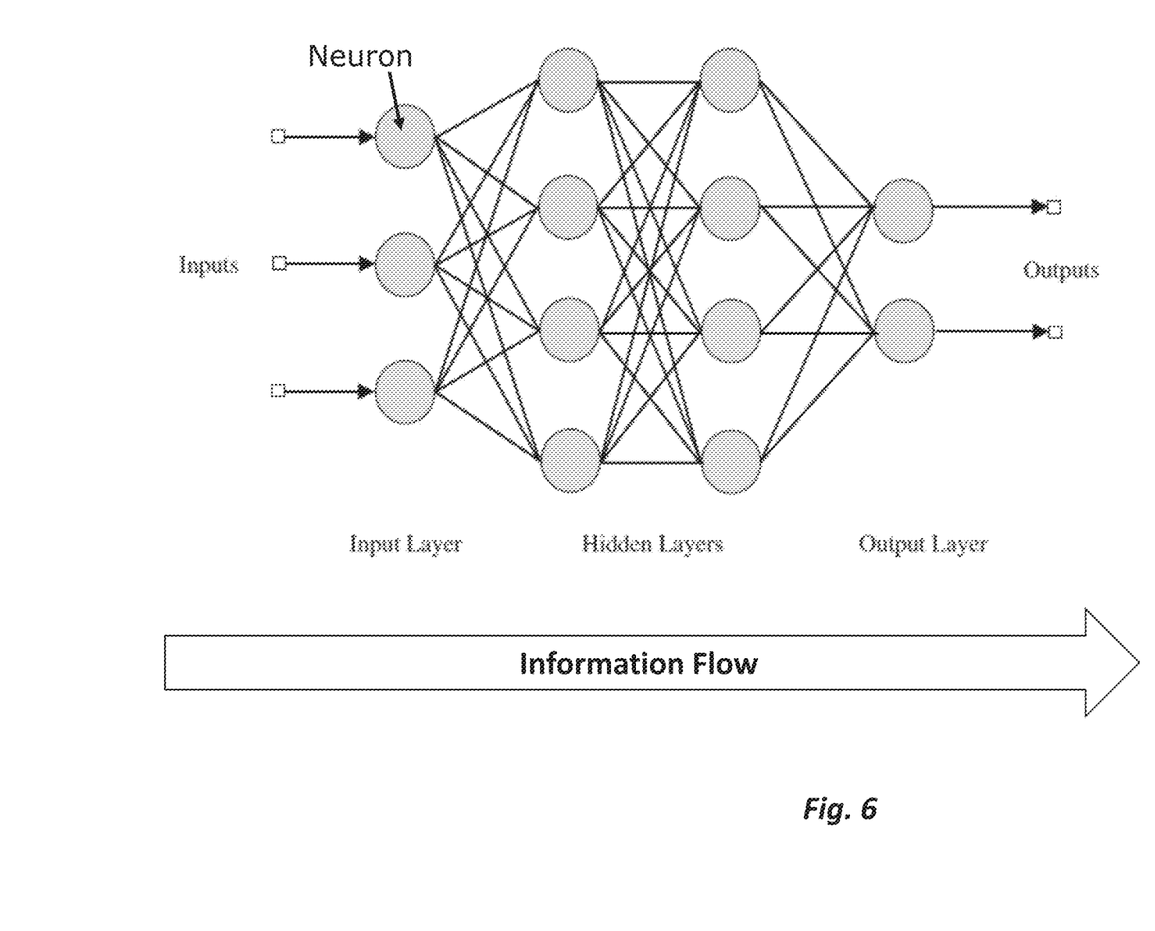
FIG. 6 illustrates an artificial neural network.

The ML-based prediction may be generated using a neural network, e.g., a feedforward neural network as illustrated in FIG. 6. As seen there, each of several layers in the neural network has several neurons, with each of these neurons performing some or all of the following steps:
  summing its inputs, with a weighted sum
  adding a bias
  applying an activation function, where the value of the activation function is the output of the neuron.
The complexity of the neural network is driven by the number of hidden layers.

Figure 7:
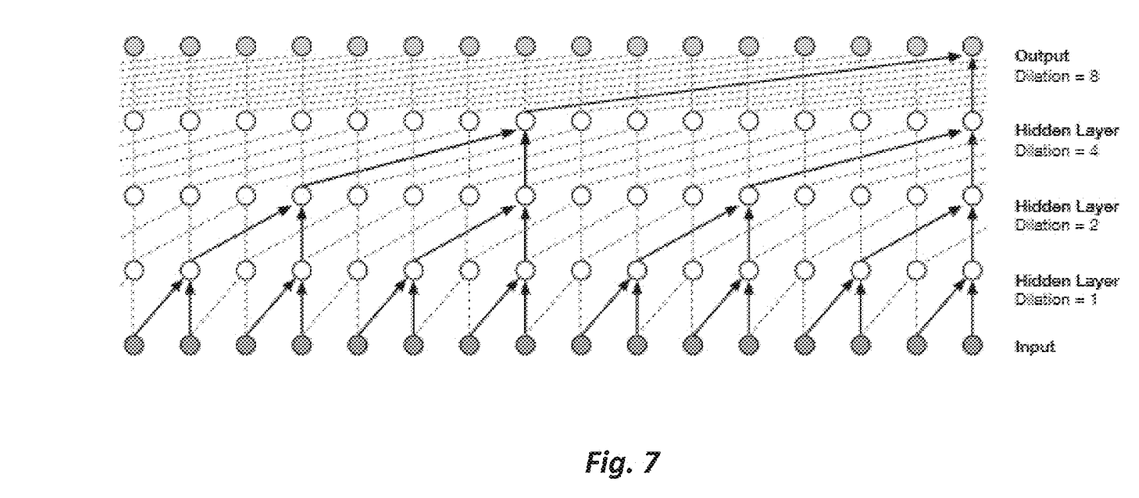
FIG. 7 illustrates an example of dilated causal convolutional layers.

FIG. 7 shows an example implementation of a neural network using dilated causal convolutional layers. Here, the model has stacked layers of dilated convolutions. More information on this approach to this approach to neural network modeling may be found at https://arxiv.org/pdf/1609.03499.pdf.

Figure 8:
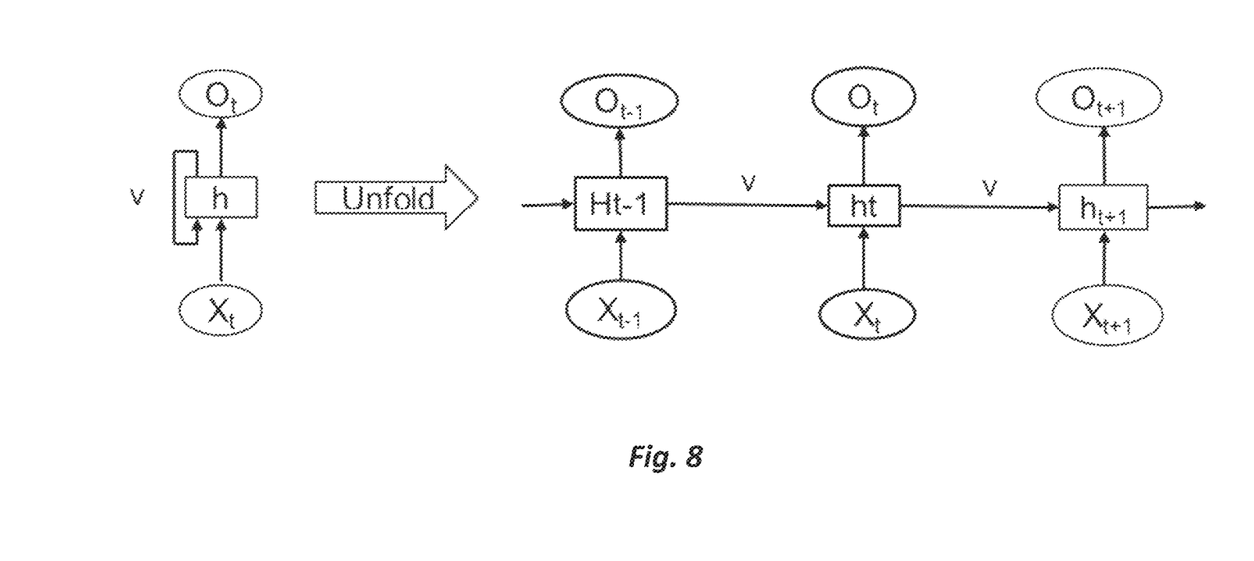
FIG. 8 shows an unfolded recurrent neural network.
Figure 9:
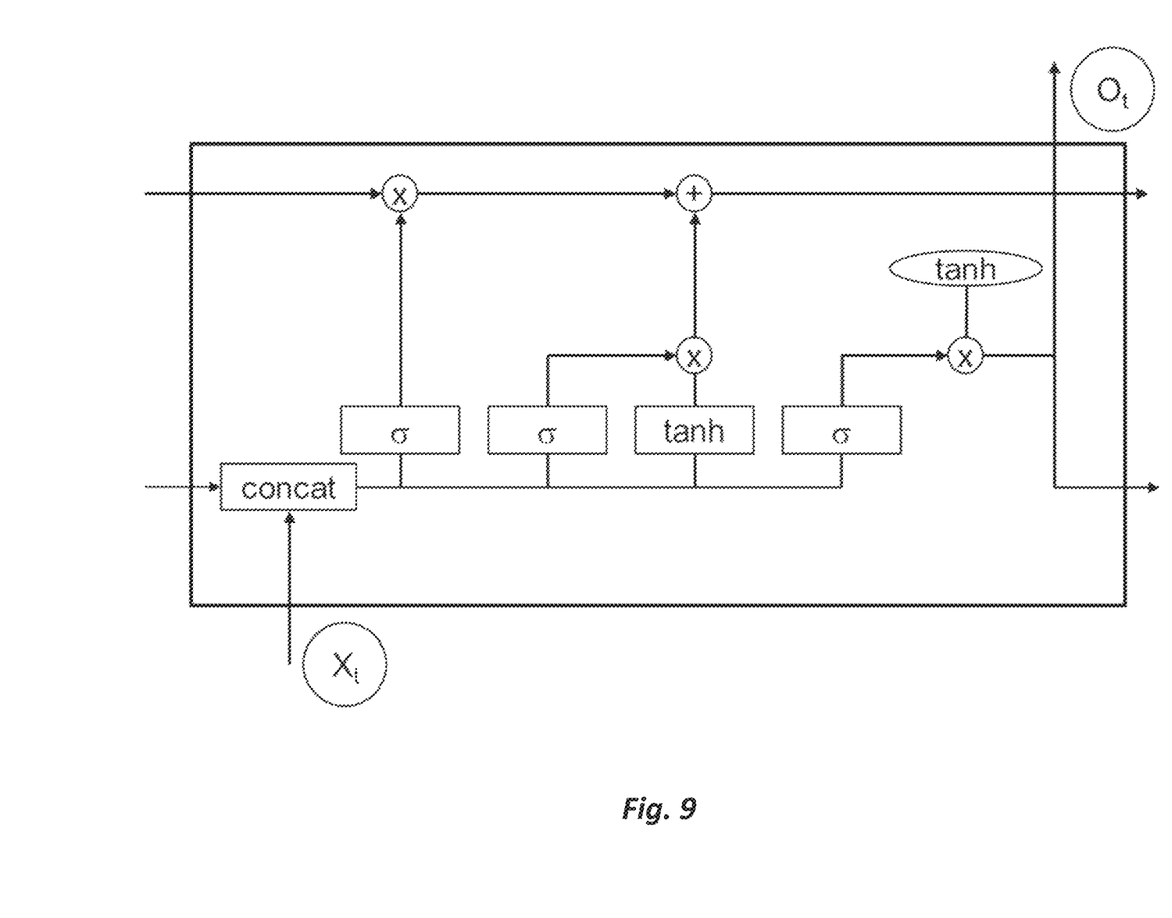
FIG. 9 illustrates a long short-term memory network.
Figure 10:
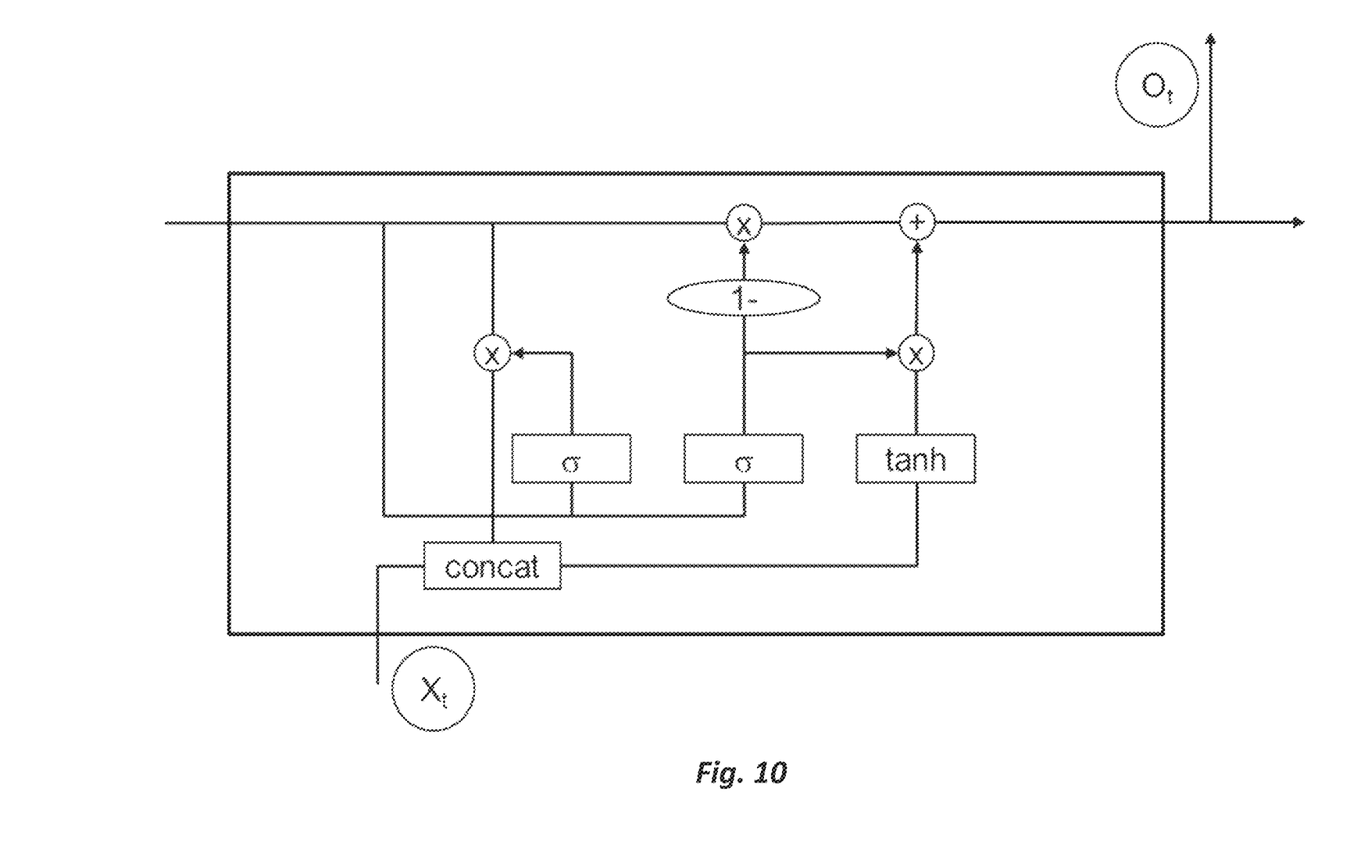
FIG. 10 shows a gated recurrent unit (GRU).
Figure 11:
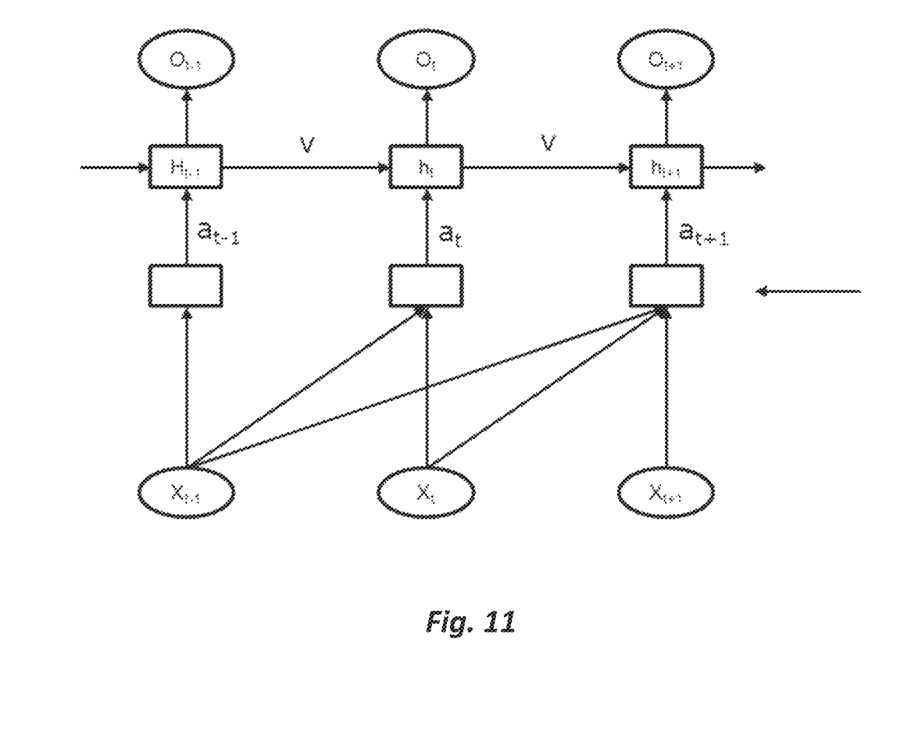
FIG. 11 illustrates an example attention layer mechanism.

Recurrent neural networks, where connections between nodes form a directed graph along a temporal sequence, may be used in some implementations of the power conversion regulator circuits described herein. FIG. 8 shows an unfolded basic recurrent neural network. Other implementations may use a long short-term memory (LSTM) network, an example of which is shown in FIG. 9, or gated recurrent units (GRUs), one example variation of which is shown in FIG. 10. Some embodiments may use an attention mechanism, an example of which is shown in FIG. 11, where the attention layer in the middle determines which information in the time series is relevant for the prediction.

Figure 12:
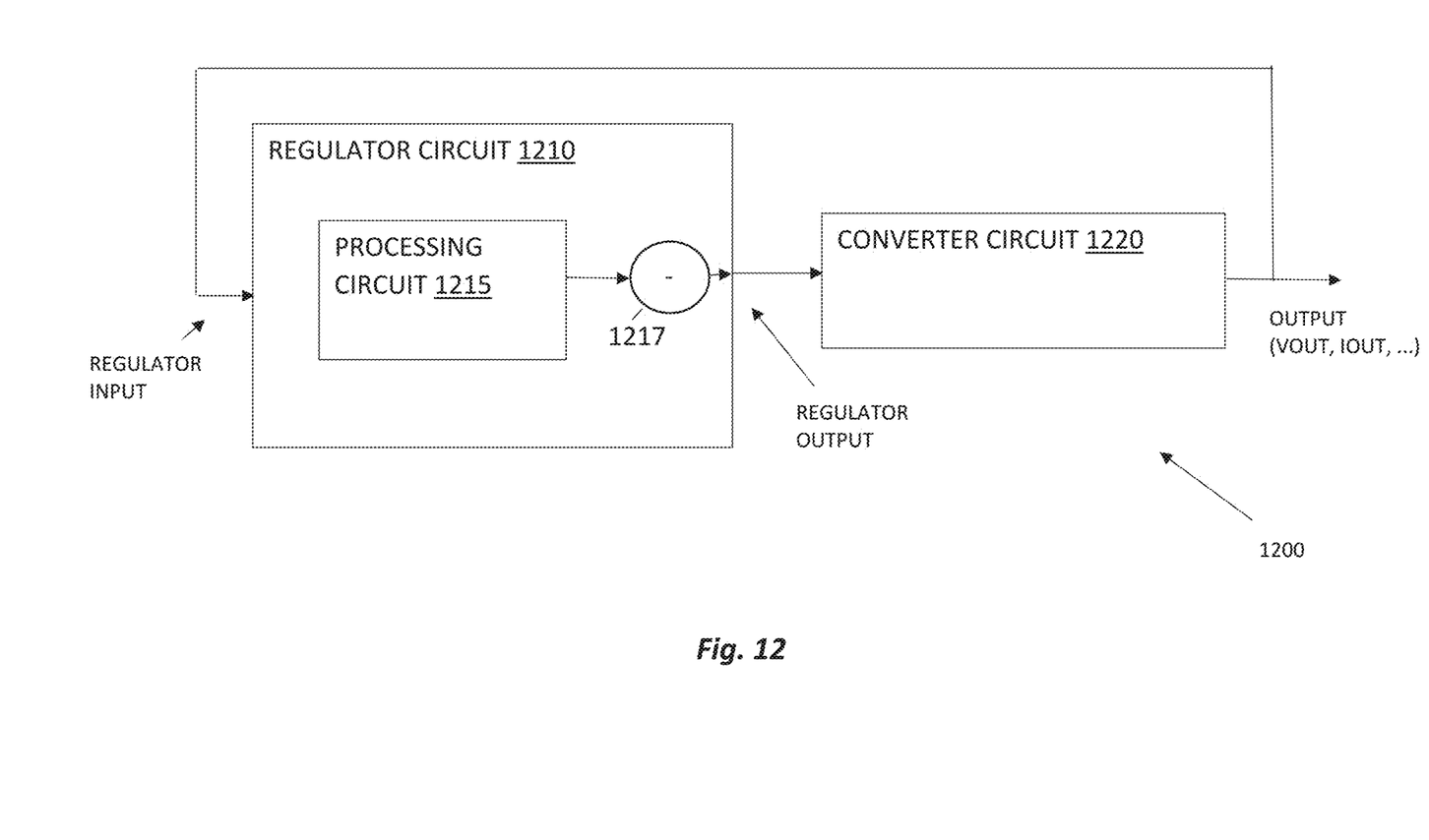
FIG. 12 is a block diagram illustrating an example regulated power converter.

FIG. 12 is a block diagram illustrating an example regulating power converter 1200 embodying the power conversion regulation techniques described above. Regulating power converter 1200 includes a regulator circuit 1210 and a power converter circuit 1220.

Power converter circuit 1220 is configured to perform power conversion of a power converter input to a power converter output, where at least one parameter of the power converter output is adjustable via a control signal input to the power converter circuit, and thus may comprise any of a wide variety of converter configurations with a control input, such as, for example, any of the various configurations commonly used in a switched-mode power supply.

Power conversion regulator circuit 1210, which may be simply referred to as "regulator circuit 1210," is operatively coupled to the power converter circuit and has a regulator input configured to be dynamically supplied with a feedback signal representative of an output parameter of the power converter circuit 1220 and a regulator output configured to dynamically provide a control signal to the power converter circuit, for making adjustments to the output of the power converter circuit. By "dynamically" is meant that this is a continuing process, not a one-time event. In other words, adjustments to the control signals are made repeatedly, or continuously.

Regulator circuit 1210 further comprises a processing circuit 1215. In some embodiments, this is configured to (a) implement an artificial neural network comprising a plurality of artificial neurons, wherein the artificial neural network is configured to compute a machine-learning-based (ML-based) prediction of the output parameter, based on the feedback signal, and (b) generate an error signal based at least in part on the ML-based prediction of the output parameter and based on a target level for the output parameter. Note that this neural network may be implemented entirely digitally, in some embodiments, or at least partially in analog form, in others, according to any of the wide variety of neural network configurations that are known. Regulator circuit 1210 still further comprises regulator circuitry configured to generate the control signal for outputting via the regulator output, based on the error signal. This may comprise, for example, driver circuitry configured to convert the error signal into a form suitable for controlling converter circuit 1220.

In some embodiments, the processing circuit 1215 is configured to generate the error signal by computing a weighted combination of at least the ML-based prediction of the output parameter and a value representative of the current state of the output parameter and computing a difference between the weighted combination and the target level for the output parameter. In some of these embodiments, for example, the processing circuit 1215 is configured to compute the weighted combination according to:

$$X_{pred}=\lambda * X_{out}+(1-\lambda)X_{ML},$$

where $X_{pred}$ is the weighted combination, $X_{out}$ is the value representative of the current state of the output parameter, $X_{ML}$ is the ML-based prediction, and A is a weighting parameter. In these embodiments, the weighting parameter $\lambda$ may be calculated according to:

$$\lambda=\max(\lambda_{min},\min(\lambda_{max},|X_{out}[t]-X_{pred}[t-1]|/(\mu|X_{out}[t]|+|X_{pred}[t-1]|)),$$

for example, where $\lambda_{min}$, $\lambda_{max}$, and $\mu$ are predetermined tuning parameters, $X_{out}[t]$ is the value representative of the current state of the output parameter, and $X_{pred}[t-1]$ is a previous value of the weighted combination. Other formulas for calculating and updating the weighting parameter may be used, of course.

As noted above, the artificial neural network may be implemented at least partly in digital form, in some embodiments. Thus, in some embodiments the regulator circuit 1210 may comprise a sampling circuit configured to output a time-series of values based on the feedback signal, where the artificial neural network is configured to compute the ML-based prediction of the output parameter based at least on the time-series of values. A sampling circuit is not shown in FIG. 12, but an example is illustrated in FIG. 6.

Note that in the just described embodiments, the artificial neural network predicts a representation of an output parameter, with that prediction then being used, e.g., with a target level, to generate an error signal from which the control signal is derived. In a variation of this approach, the artificial neural network may generate the error signal directly. Thus, in some embodiments, the processing circuit 1215 is configured to (a) implement an artificial neural network comprising a plurality of artificial neurons, where the artificial neural network is configured to compute a machine-learning-based (ML-based) error signal, based on at least the feedback signal and a target level for the output parameter, and (b) output a correction signal, based at least in part on the ML-based error signal. In these embodiments, the regulator circuitry 1217 is configured to generate the control signal for outputting via the regulator output, based at least in part on the correction signal.

In some of these embodiments, then, the processing circuit 1210 is configured to generate the correction signal by computing a weighted combination of at least the ML-based error signal and a value representative of a difference between the current state of the output parameter and the target level for the output parameter. This might be done according to:

$$X_{corr}=\lambda * X_{diff}+(1-\lambda)X_{ML},$$

for example, where $X_{corr}$ is the weighted combination, $X_{diff}$ is the value representative of a difference between the current state of the output parameter and the target level for the output parameter, $X_{ML}$ is the ML-based error signal, and A is a weighting parameter.

As in the embodiments discussed above, the weighting parameter $\lambda$ may be calculated according to:

$$\lambda=\max(\lambda_{min},\min(\lambda_{max},|X_{out}[t]-X_{corr}[t-1]|/(\mu|X_{diff}[t]|+|X_{corr}[t-1]|)),$$

in some embodiments, where $\lambda_{min}$, $\lambda_{max}$, and $\mu$ are predetermined tuning parameters, $X_{diff}[t]$ is the value representative of a difference between the current state of the output parameter and the target level for the output parameter, and $\lambda_{corr}[t-1]$ is a previous value of the weighted combination.

Likewise, some embodiments may comprise a sampling circuit configured to output a time-series of values based on the feedback signal, wherein the artificial neural network is configured to compute the ML-based prediction of the error signal based at least on the time-series of values.

In any of the embodiments discussed above, the output parameter represented by the feedback signal supplied to the regulator input may represent any one of: an output voltage of the power converter circuit; an output current of the power converter circuit; and an output power of the power converter circuit. In any of the embodiments discussed above, the artificial neural network may be configured to compute the ML-based prediction based on the first feedback signal and one or more additional feedback signals.

In some embodiments, as suggested above, at least a part of the artificial neural network is implemented with analog artificial neurons. The artificial neural network may be implemented as a feedforward neural network, e.g., as a dilated causal convolutional neural network, a recurrent neural network, a long short-term memory (LSTM) network, and/or a network that includes one or more gated recurrent units (GRUs). The artificial neural network may include an attention mechanism, in some embodiments, and/or may include any form of residual neural network architecture.

Figure 13:
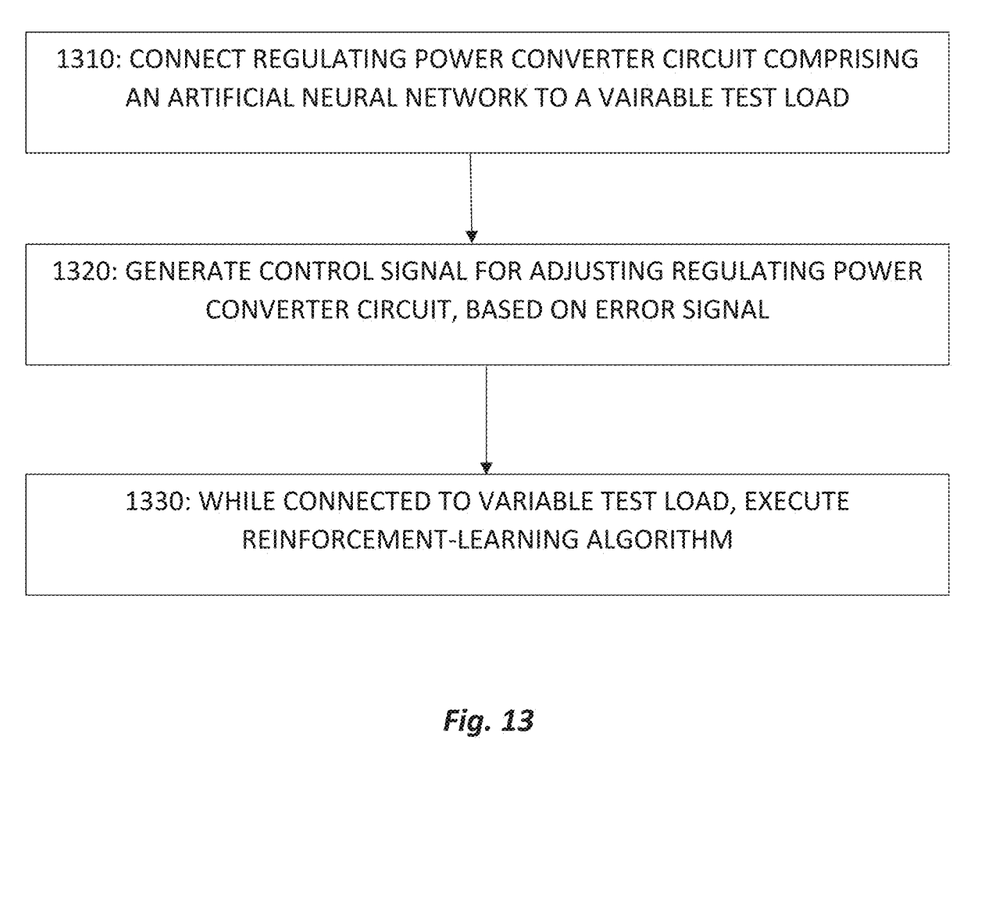
FIG. 13 is a process flow diagram illustrating an example method for training an artificial neural network for inclusion in a power conversion regulator circuit.

A regulating power converter like that shown in FIG. 12 can be trained by connecting it to a variable test load and executing a reinforcement-learning algorithm that defines biases and weights for the artificial neural network, in response to the varying load conditions provided by the variable test load. FIG. 13 is a process flow diagram illustrating an example method for, somewhat more generally, training an artificial neural network for inclusion in a power conversion regulator circuit, e.g., like that shown in FIG. 12.

As seen at block 1310, the illustrated method includes the step of connecting a regulating power converter circuit comprising an implementation of the artificial neural network to a variable test load, where the implementation of the artificial neural network is configured to (a) implement an artificial neural network comprising a plurality of artificial neurons, wherein the artificial neural network is configured to compute a machine-learning-based (ML-based) prediction of a value representative of an output parameter of the regulating power converter circuit, based on the feedback signal, and (b) generate an error signal based at least in part on the ML-based prediction of the value and based on a target level for the value. As shown at block 1320, the method further comprises generating a control signal for adjusting the output of the regulating power converter circuit, based on the error signal.

As shown at block 1330, while the regulating power converter is connected to the variable test load, a reinforcement-learning algorithm that defines biases and weights for the artificial neural network is executed. These biases and weights enable the artificial neural network to regulate the output of the power converter circuit over a range of loads and target levels for the at least one parameter fed back to the artificial neural network.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power conversion regulator circuit, comprising:
   a regulator input configured to be dynamically supplied with a feedback signal representative of an output parameter of a power converter circuit;
   a regulator output configured to dynamically provide a control signal to the power converter circuit, for making adjustments to the output of the power converter circuit;
   a processing circuit configured to (a) implement an artificial neural network comprising a plurality of artificial neurons, wherein the artificial neural network is configured to compute a machine-learning-based (ML-based) prediction of the output parameter, based on the feedback signal, and (b) generate an error signal based at least in part on the ML-based prediction of the output parameter and based on a target level for the output parameter; and
   regulator circuitry configured to generate the control signal for outputting via the regulator output, based on the error signal.

2. The power conversion regulator circuit of claim 1, wherein the processing circuit is configured to generate the error signal by computing a weighted combination of at least the ML-based prediction of the output parameter and a value representative of the current state of the output parameter and computing a difference between the weighted combination and the target level for the output parameter.

3. The power conversion regulator circuit of claim 2, wherein the processing circuit is configured to compute the weighted combination according to:

$$X_{pred} = \lambda * X_{out} + (1-\lambda) X_{ML},$$

where $X_{pred}$ is the weighted combination, $X_{out}$ is the value representative of the current state of the output parameter, $X_{ML}$ is the ML-based prediction, and $\lambda$ is a weighting parameter.

4. The ML-based power conversion regulator circuit of claim 3, wherein $\lambda$ is calculated according to:

$$\lambda = \max(\lambda_{min}, \min(\lambda_{max}, |X_{out}[t] - X_{pred}[t-1]|/(\mu|X_{out}[t]| + |X_{pred}[t-1]|)),$$

where $\lambda_{min}$, $\lambda_{max}$, and $\mu$ are predetermined tuning parameters, $X_{out}[t]$ is the value representative of the current state of the output parameter, and $X_{pred}[t-1]$ is a previous value of the weighted combination.

5. The power conversion regulator circuit of any one of claims 1-4, further comprising a sampling circuit configured to output a time-series of values based on the feedback signal, wherein the artificial neural network is configured to compute the ML-based prediction of the output parameter based at least on the time-series of values.

6. The power conversion regulator circuit of claim 1, wherein the output parameter represented by the feedback signal represents any one of:
   an output voltage of the power converter circuit;
   an output current of the power converter circuit; and
   an output power of the power converter circuit.

7. The power conversion regulator circuit of claim 1, wherein the artificial neural network is configured to compute the ML-based prediction based on the first feedback signal and one or more additional feedback signals.

8. The power conversion regulator circuit of claim 1, wherein at least a part of the artificial neural network is implemented with analog artificial neurons.

9. The power conversion regulator circuit of claim 1, wherein the artificial neural network is implemented as a feedforward neural network.

10. The power conversion regulator circuit of claim 9, wherein the artificial neural network is implemented as a dilated causal convolutional neural network.

11. The power conversion regulator circuit of claim 9, wherein the artificial neural network is implemented as a recurrent neural network.

12. The power conversion regulator circuit of claim 9, wherein the artificial neural network is a long short-term memory (LSTM) network and/or includes one or more gated recurrent units (GRUs).

13. The power conversion regulator circuit of claim 9, wherein the artificial neural network includes an attention mechanism.

14. The power conversion regulator circuit of claim 1, wherein the artificial neural network includes any form of residual neural network architecture.

15. A regulating power converter, comprising:
- a power converter circuit configured to perform power conversion of a power converter input to a power converter output, wherein at least one parameter of the power converter output is adjustable via a control signal input to the power converter circuit; and
- a power conversion regulator circuit operatively coupled to the power converter circuit, the power conversion regulator circuit comprising:
  - a regulator input configured to be dynamically supplied with a feedback signal representative of the one parameter;
  - a regulator output configured to dynamically provide a control signal to the power converter circuit, for making adjustments to the output of the power converter circuit; and
  - a processing circuit configured to (a) implement an artificial neural network comprising a plurality of artificial neurons, wherein the artificial neural network is configured to compute a machine-learning-based (ML-based) prediction of the one parameter, based on the feedback signal, and (b) generate an error signal based at least in part on the ML-based prediction of the one parameter and based on a target level for the one parameter; and
  - regulator circuitry configured to generate the control signal for outputting via the regulator output, based on the error signal.

16. A method for training an artificial neural network for inclusion in a power conversion regulator circuit, the method comprising:
- connecting a regulating power converter circuit comprising an implementation of the artificial neural network to a variable test load, wherein the implementation of the artificial neural network is configured to (a) implement an artificial neural network comprising a plurality of artificial neurons, wherein the artificial neural network is configured to compute a machine-learning-based (ML-based) prediction of a value representative of an output parameter of the regulating power converter circuit, based on a feedback signal representative of the output parameter, and (b) generate an error signal based at least in part on the ML-based prediction of the value and based on a target level for the value;
- generating a control signal for adjusting the output of the regulating power converter circuit, based on the error signal; and
- while the regulating power converter is connected to the variable test load, executing a reinforcement-learning algorithm that defines biases and weights for the artificial neural network, the biases and weights enabling the artificial neural network to regulate the output of the power converter circuit over a range of loads and target levels for the output parameter.

* * * * *